US010755297B1

(12) United States Patent
Smith

(10) Patent No.: US 10,755,297 B1
(45) Date of Patent: Aug. 25, 2020

(54) SYSTEM FOR PROCESSING A DIGITAL PROMOTION BASED UPON USER-PROVIDED IDENTIFICATION CODE UNIQUENESS DETERMINATION AND RELATED METHODS

(71) Applicant: INMAR CLEARING, INC., Winston-Salem, NC (US)

(72) Inventor: Zackary Smith, Seattle, WA (US)

(73) Assignee: INMAR CLEARING, INC., Winston-Salem, NC (US)

( * ) Notice: Subject to any disclaimer, the term of this patent is extended or adjusted under 35 U.S.C. 154(b) by 48 days.

(21) Appl. No.: 16/156,695

(22) Filed: Oct. 10, 2018

(51) Int. Cl.
*G06Q 30/02* (2012.01)

(52) U.S. Cl.
CPC ..... *G06Q 30/0225* (2013.01); *G06Q 30/0238* (2013.01); *G06Q 30/0267* (2013.01)

(58) Field of Classification Search
CPC ........... G06Q 30/0225; G06Q 30/0267; G06Q 30/0238
See application file for complete search history.

(56) References Cited

U.S. PATENT DOCUMENTS

| 10,051,001 | B1* | 8/2018 | Ashley | H04L 63/10 |
| 2005/0228719 | A1* | 10/2005 | Roberts | G06O 30/0267 |
| | | | | 705/14.58 |
| 2011/0106605 | A1* | 5/2011 | Malik | G06Q 30/02 |
| | | | | 705/14.23 |
| 2012/0150746 | A1* | 6/2012 | Graham | G06Q 30/02 |
| | | | | 705/50 |
| 2014/0108177 | A1* | 4/2014 | Erke | G06Q 30/0601 |
| | | | | 705/26.1 |
| 2014/0257956 | A1* | 9/2014 | Durbha | G06Q 30/0225 |
| | | | | 705/14.23 |

(Continued)

OTHER PUBLICATIONS

"How to distribute unique discount codes (or vouchers) to the subscribers", by Jagoda Hryszko. Voucherify Blog. Oct. 5, 2018. Year: 2018).*

(Continued)

*Primary Examiner* — William A Brandenburg
(74) *Attorney, Agent, or Firm* — Allen, Dyer, Doppelt + Gilchrist, P.A.

(57) ABSTRACT

A system for processing a digital promotion may include a mobile wireless communications and a digital promotion server. The server may generate a digital promotion for a given product based upon a promotion request, and communicate the digital promotion to the mobile device based upon the promotion request. The server may cooperate with the mobile device to prompt the user for a user-provided identification code for redemption of the digital promotion at a redemption location, and determine whether the user-provided identification code is unique relative to other user-provided identification codes. When unique, the user-provided identification code may be stored for redemption of the digital promotion, otherwise a server-provided unique identification code may be generated and communicated to the mobile device. The server may cooperate with the redemption location to redeem the digital promotion based upon one of the user-provided identification code and the server-provided unique identification code.

24 Claims, 5 Drawing Sheets

(56) References Cited

U.S. PATENT DOCUMENTS

2016/0149919 A1* 5/2016 Gauthier ............... H04L 43/08
726/7

OTHER PUBLICATIONS

"User Guide: Online POS Terminal", by Chase JP Morgan Commerce Solutions. Jul. 2016. (Year: 2016).*
"Transaction Acceptance Device Guide (TADG)", by Visa. Version 3.0. May 15, 2015. (Year: 2015).*
"First Data Market Insight: Solving Fraudulent Redemption: A Simple Solution for Coupons, Daily Deals and Other Promotions", by First Data. 2012. (Year: 2012).*

* cited by examiner

US 10,755,297 B1

SYSTEM FOR PROCESSING A DIGITAL PROMOTION BASED UPON USER-PROVIDED IDENTIFICATION CODE UNIQUENESS DETERMINATION AND RELATED METHODS

TECHNICAL FIELD

The present invention relates to the field of electronics, and more particularly, to processing a digital promotion and related methods.

BACKGROUND

Sales of a particular product or service may be based upon how well that product or service is marketed to a consumer. One form of marketing is a coupon, typically in paper form, for a discount toward the product or service. Some coupons may be retailer specific, for example, only redeemable for the discount at a particular retailer, while other coupons may be product specific from a manufacturer and redeemable at any retailer.

A coupon, while typically in paper form, may be in digital form and may be referred to as a digital promotion. A digital promotion may be selected or "clipped" via a mobile phone and saved to a digital wallet for redemption at a point-of-sale (POS) terminal, for example. A typical coupon is applicable to a given product and has a redeemable value that may vary based upon, for example, the quantity of a given item, brand of item, size of the product in terms of packaging, and/or the price point of the given item. A typical coupon may also be redeemable only at a given retailer and/or within a threshold time period.

Another type of promotion is a gift card. A gift card may be retailer specific, for example, which are typically redeemable only at one or more retailers or family of retailers (e.g., brand). A gift card may be redeemable toward a product or products and services at the retailer, for example.

SUMMARY

A system for processing a digital promotion may include a plurality of mobile wireless communications devices, each associated with a respective user, and a digital promotion server. The digital promotion server may be configured to generate a digital promotion for a given product based upon a promotion request, and communicate the digital promotion to a given mobile wireless communications device based upon the promotion request. The digital promotion server may be configured to cooperate with the given mobile wireless communications device to prompt the user for a user-provided identification code for redemption of the digital promotion at a redemption location. The digital promotion server may also be configured to determine whether the user-provided identification code is unique relative to other user-provided identification codes provided by other mobile wireless communications devices from among the plurality thereof, and when so, store the user-provided identification code for redemption of the digital promotion, otherwise generate a server-provided unique identification code and communicate the server-provided unique identification code to the given mobile wireless communications device. The digital promotion server may also be configured to cooperate with the redemption location to redeem the digital promotion for the given product based upon one of the user-provided identification code and the server-provided unique identification code.

The system may further include a point-of-sale (POS) terminal at the redemption location, and the digital promotion server may be configured to cooperate with the POS terminal to redeem the digital promotion. The digital promotion server may be configured to cooperate with the POS terminal to redeem the digital promotion based upon input of one of the user-provided identification code and the server-provided unique identification code, for example.

The digital promotion server may be configured to determine a character set input capability corresponding to the POS terminal and prompt the user for the user-provided identification code based upon the character set input capability, for example. The system may also include a promotion provider mobile wireless communications device configured to communicate the promotion request to the digital promotion server.

The digital promotion server may be configured to operate a messenger bot, and wherein the promotion request may be made via the messenger bot, for example. The digital promotion server may be configured to determine whether the user-provided identification code is unique based upon a Bloom filter, for example.

The digital promotion may have a redemption value associated therewith. The digital promotion server may be configured to cooperate with the redemption location to apply a credit to a guest check associated with the user in an amount equal to the redemption value. The redemption value may correspond to an entire purchase price of the given product, for example.

A method aspect is directed to a method of processing a digital promotion. The method may include using a digital promotion server to generate a digital promotion for a given product based upon a promotion request, and communicate the digital promotion to a given mobile wireless communications device from among a plurality thereof based upon the promotion request. The method may also include using the digital promotion server to cooperate with the given mobile wireless communications device to prompt a respective user for a user-provided identification code for redemption of the digital promotion at a redemption location. The method may further include using the digital promotion server to determine whether the user-provided identification code is unique relative to other user-provided identification codes provided by other mobile wireless communications devices from among the plurality thereof, and when so, store the user-provided identification code for redemption of the digital promotion, otherwise generate a server-provided unique identification code and communicate the server-provided unique identification code to the given mobile wireless communications device. The method may also include using the digital promotion server to cooperate with the redemption location to redeem the digital promotion for the given product based upon one of the user-provided identification code and the server-provided unique identification code.

A computer readable medium is directed to non-transitory computer readable medium for processing a digital promotion. The non-transitory computer readable medium includes computer executable instructions that when executed by a processor cause the processor to perform operations. The operations may include generating a digital promotion for a given product based upon a promotion request, and communicating the digital promotion to a given mobile wireless communications device from among a plurality thereof based upon the promotion request. The operations may include cooperating with the given mobile wireless communications device to prompt a respective user for a user-provided identification code for redemption of the digital promotion at a redemption location. The operations may also include determining whether the user-provided identification code is unique relative to other user-provided identification codes provided by other mobile wireless communications devices from among the plurality thereof, and when so, storing the user-provided identification code for redemption of the digital promotion, otherwise generating a server-provided unique identification code and communicating the server-provided unique identification code to the given mobile wireless communications device. The operations may further include cooperating with the redemption location to redeem the digital promotion for the given product based upon one of the user-provided identification code and the server-provided unique identification code.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
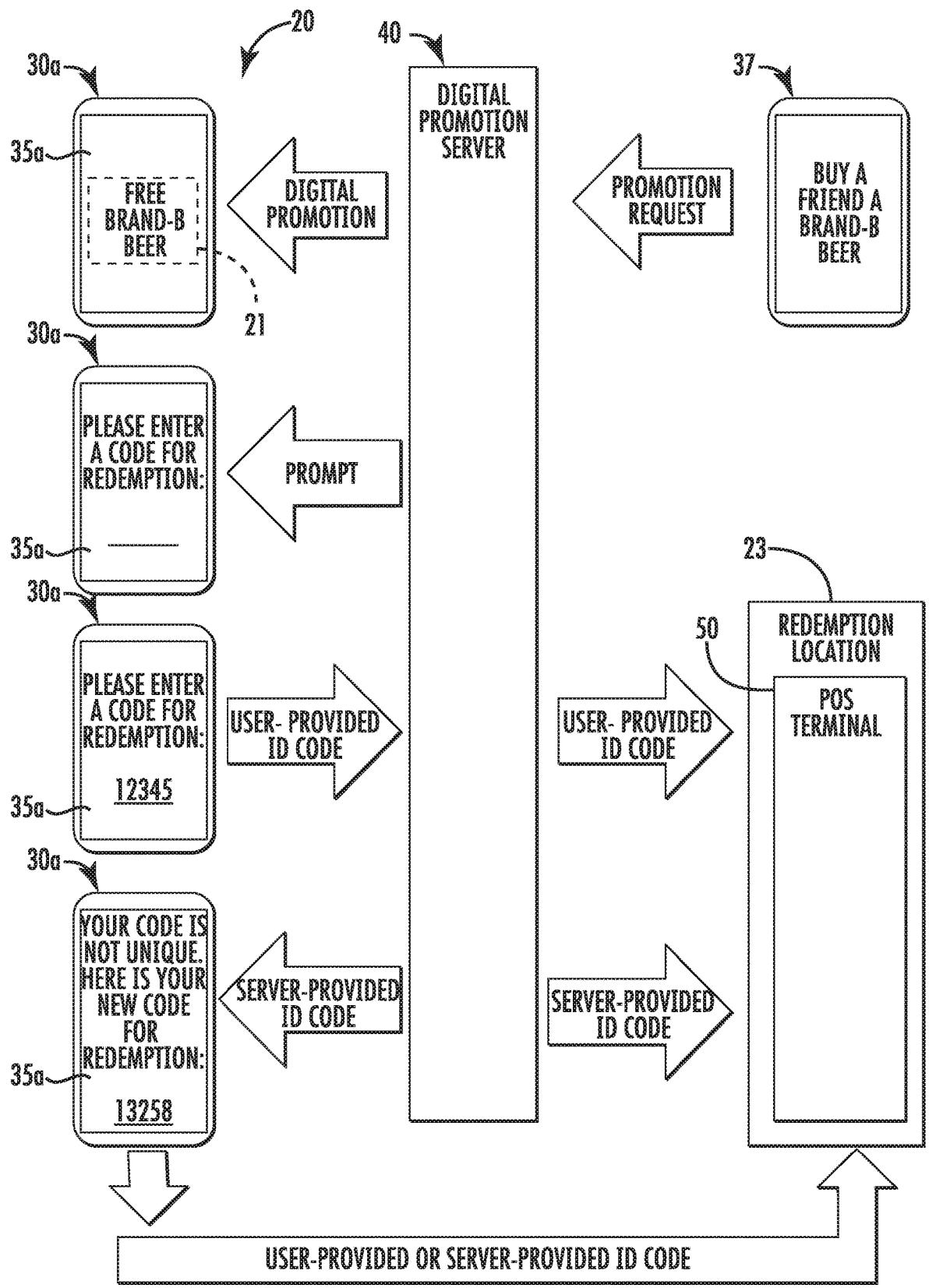
FIG. 1 is a schematic diagram of a system for processing a digital promotion in accordance with an embodiment.
Figure 2:
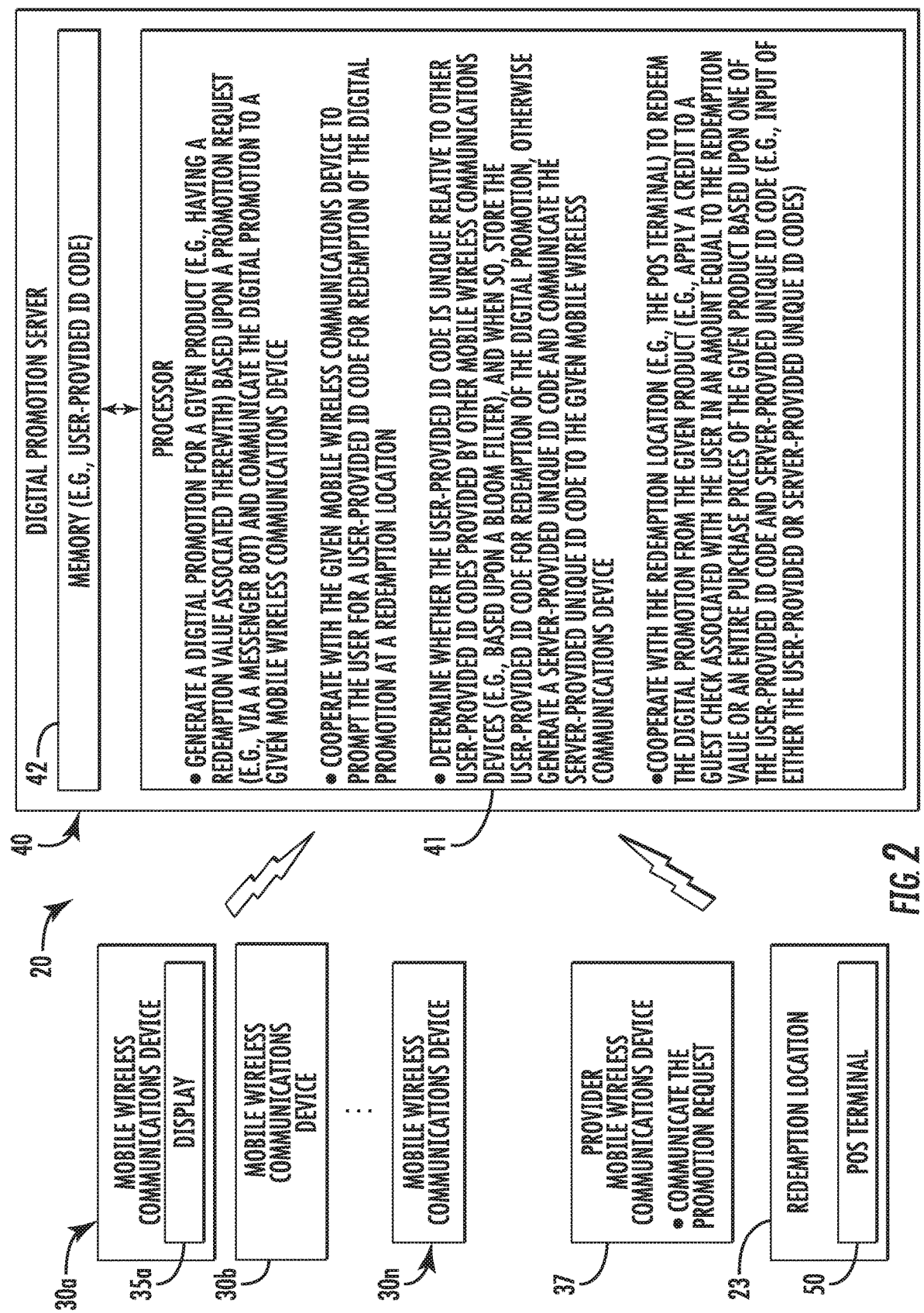
FIG. 2 is a schematic block diagram of a system for processing a digital promotion in accordance with an embodiment.

Referring initially to FIGS. 1 and 2, a system for processing a digital promotion 20 includes mobile wireless communications devices 30*a*-30*n*, each associated with a respective user. The system 20 also includes a digital promotion server 40 communicatively coupled to the mobile wireless communications devices 30*a*-30*n*. The digital promotion server 40 includes a digital promotion processor 41 and a digital promotion memory 42 coupled to the digital promotion processor. The digital promotion server 40 may be a remote computer, for example.

Figure 3:
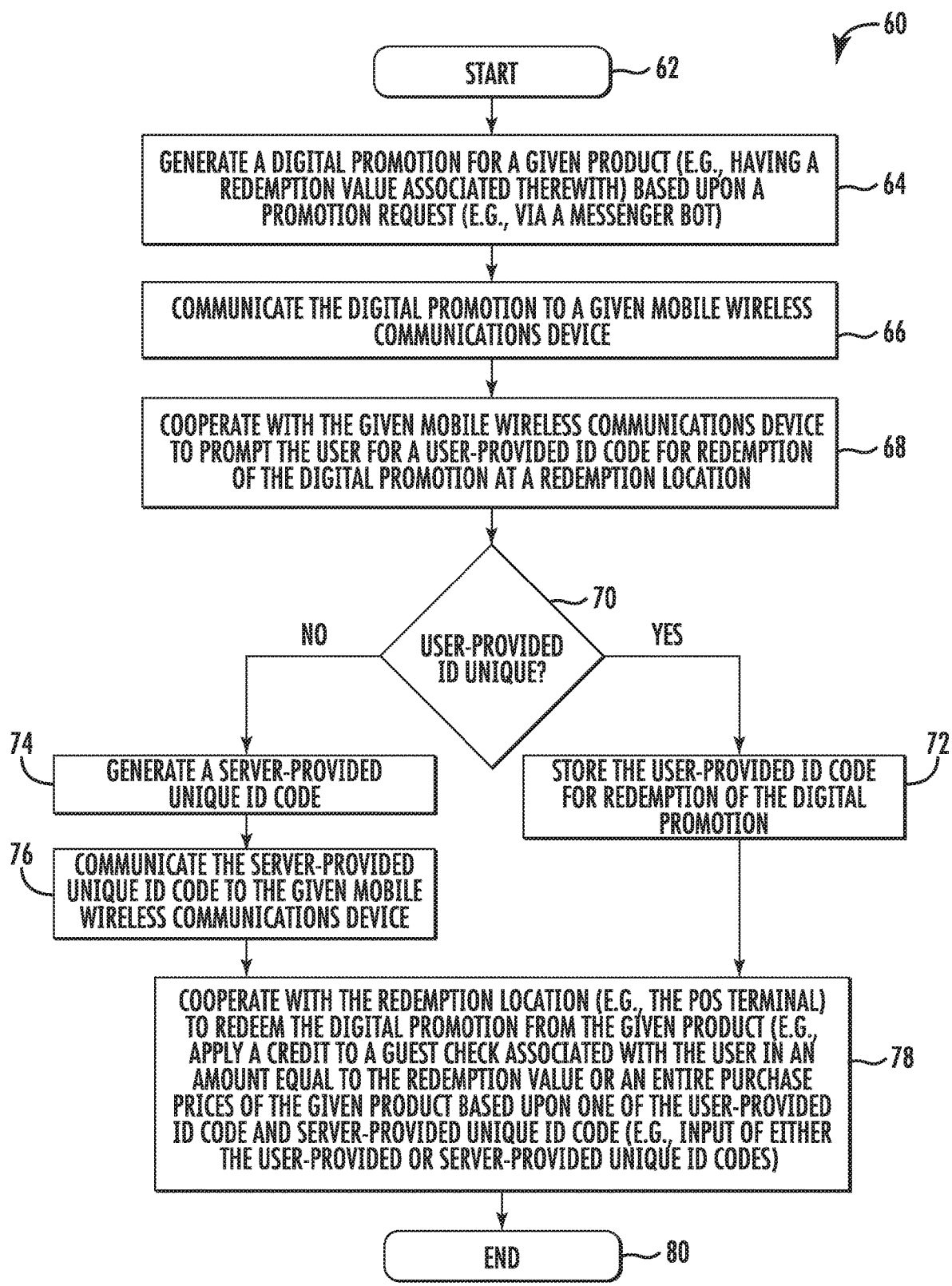
FIG. 3 is a flow chart illustrating operation of the digital promotion server of the system in FIG. 2.

Referring now additionally to the flowchart 60 in FIG. 3, details of operation of the system 20 will now be described with reference to the digital promotion server 40. It should be understood that while operations are described with respect to the digital promotion server 40, the operations are performed based upon cooperation between the digital promotion processor 41 and the digital promotion memory 42.

Beginning at Block 62, the digital promotion server 40 generates a digital promotion 21 for a given product based upon a promotion request (Block 64). The promotion request may be made by a promotion provider mobile wireless communications device 37. More particularly, the promotion request may be made by another user who may be desirous of gifting a digital promotion (e.g., a free or discounted product, a credit toward products or services at a retailer or brand of retailers, etc.) to a given user associated with a given mobile wireless communications device 30*a*-30*n*. The promotion request may also be made by the given user. In some embodiments, the user associated with the promotion provider mobile wireless communications device 37 may purchase the digital promotion 21 for gifting. Further details of a gifting system in which the present embodiments may be implemented is described in U.S. Patent Application Publication No. 2014/0108177 assigned to Carolina Manufacturer's Services, Inc. and the entire contents of which are herein incorporated by reference.

In another embodiment, the digital promotion 21' may also be provided without a charge, for example, by a brand or manufacturer to entice usage of the given product. Thus, the manufacturer or brand may make the promotion request.

Figure 4:
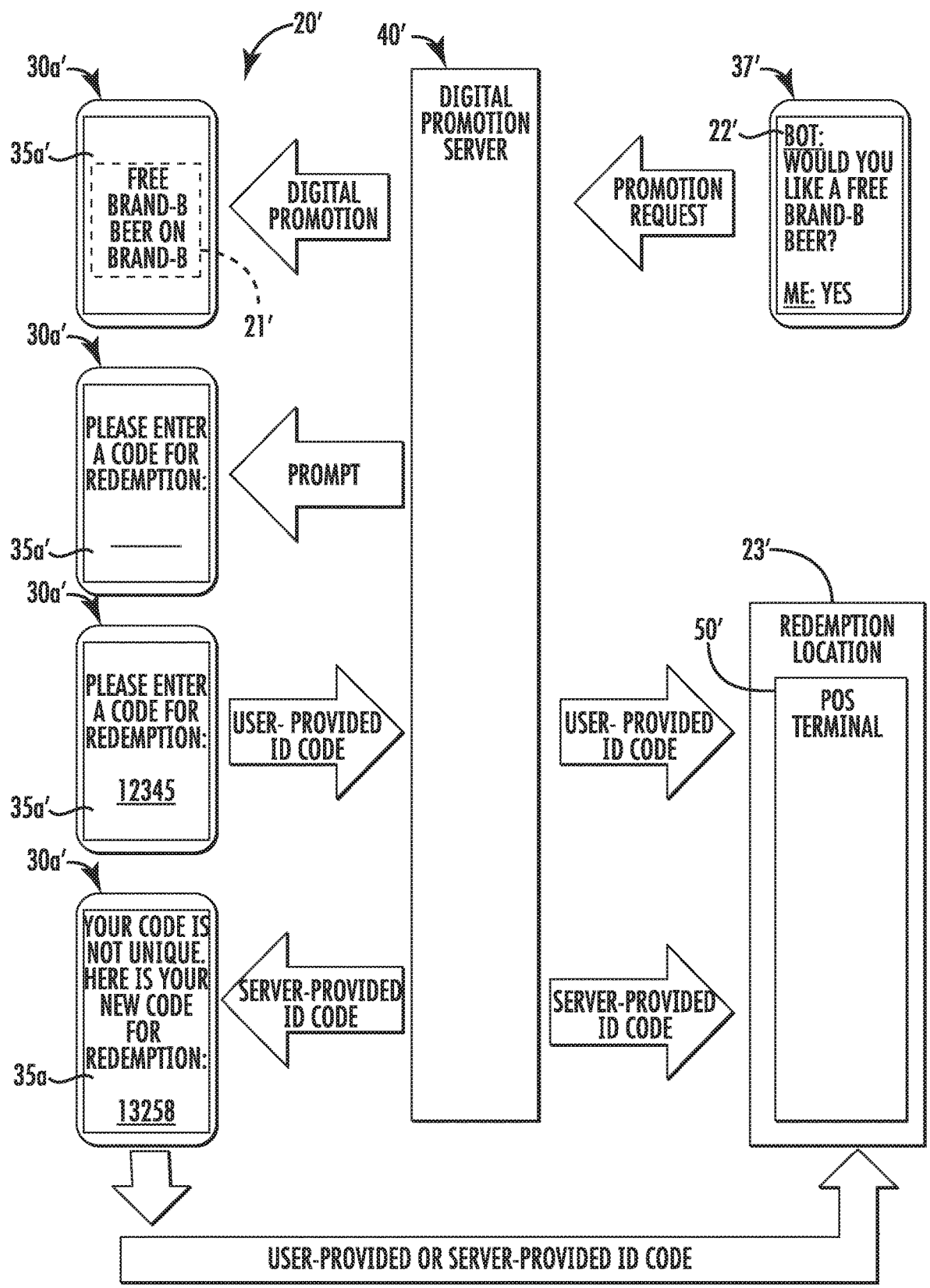
FIG. 4 is a schematic diagram of a system for processing a digital promotion in accordance with another embodiment.

Referring now briefly to FIG. 4, in another embodiment the digital promotion server 40' may operate a messenger bot 22' to communicate, for example, wirelessly, with the user. Through the messenger bot 22', the given user may request a digital promotion 21'. The messenger bot 22' may be associated with a given brand or manufacturer of the given product.

The messenger bot 22' may be implemented in the form of a two-way dialog box that permits the given user to communicate by way of typing (i.e., written communication). In some embodiments, the messenger bot 22' may operate through voice commands or spoken words. The underlying program behind the messenger bot 22' may be a different program, application, and/or website than that serving the digital promotion 21'. For example, the digital promotion 21' may be inline in a news feed on Facebook while the messenger bot 22' may be executed through the Facebook Messenger program or application. The application or program associated with the messenger bot 22' may be executed or opened, for example, based upon user selection of the digital promotion 21'.

Referring again to FIGS. 1-3, the digital promotion 21 may be redeemable at one or more redemption locations 23, for example, a restaurant, bar, etc. Of course, the digital promotion 21 may be redeemable at other types of redemption locations 23 and for other types of products. The digital promotion 21 may be in the form of a digital coupon, digital rebate, or digital gift card, as will be appreciated by those skilled in the art. In some embodiments, the digital promotion 21 may be redeemable at one or more redemption locations 23, for example, based upon user selection. In some embodiments, the redemption location 23 or locations may be determined based upon the promotion request or by the user associated with the promotion provider mobile wireless communications device 37. The digital promotion 21 may have a redemption value associated therewith. The redemption value may be for a fraction of the total cost of the given product or for the full or entire purchase price of the given product. In some embodiments, the redemption value may also include taxes and gratuities.

The given product may be a brand and/or class or type of product, for example, and may be associated with a given brand. The digital promotion 21 may be displayed on a display 35*a* of the mobile wireless communications device 30*a*, for example, inline in a social media feed. An exemplary digital promotion 21 may be along the lines of "Free Brand-B Beer". Of course, the digital promotion 21 may be included on a website, in an email, and/or other electronic form.

At Block 66, the digital promotion server 40, based upon the promotion request, communicates, for example, wirelessly, the digital promotion 21 to the given mobile wireless communications device 30*a*. The digital promotion server 40, at Block 68, cooperates with the given mobile wireless communications device 30*a* to prompt the given user for a user-provided identification (ID) code. The user-provided ID code is for redemption of the digital promotion 21 at the redemption location 23 and may be a numerical code, alphanumerical code, and include symbols, for example, emojis, etc. The prompt may be in the form of a dialog on the display 35*a* of the given mobile wireless communications device 30*a*. The user may provide input to the given mobile wireless communications device 30*a* to enter the user-provided ID code, for example, a touch display or other input device. The user-provided ID code is communicated from the given mobile wireless communications device 30*a* to the digital promotion server 40.

At Block 70, the digital promotion server 40 determines whether the user-provided ID code is unique relative to other user-provided ID codes provided by other mobile wireless communications devices 30*b*-30*n* and stored in the memory 42. The digital promotion server 40 may determine whether the user-provided ID code is unique based upon a Bloom filter, for example. Of course, other techniques, such as a matching operation, may be used to determine whether the user-provided ID code is unique.

When, at Block 70, the user-provided ID code is determined to be unique, the digital promotion server 40 stores the user-provided ID code, for example, in the memory 42, for redemption of the digital promotion 21 (Block 72). If at Block 70, the user-provided ID code is not unique, the digital promotion server, at Block 74, generates a server-provided unique ID code and communicates the server-provided unique ID code to the given mobile wireless communications device 30*a* (Block 76).

At Block 78, the digital promotion server 40 cooperates with the redemption location 23 to redeem the digital promotion 21 based upon one of the user-provided ID code and the server-provided unique ID code. More particularly, the digital promotion server 40 cooperates with a point-of-sale (POS) terminal 50 at the redemption location 23 to redeem the digital promotion 21. The digital promotion server 40 communicates either the user-provided ID code or the server-provided unique ID code to the POS terminal 50. Upon redemption, a server or staff at the redemption location, etc. provides the user-provided ID code or the server-provided unique ID code as provided by the given user. In some embodiments, either of user-provided ID code or the server-provided unique ID code may be provided to the POS terminal 50 from the given user or the given mobile wireless communications device 30*a* without involvement of staff at the redemption location.

For example, if there is a match between the user-provided ID code or the server-provided unique ID code provided as input to the POS terminal 50 and communicated to the POS terminal from the digital promotion server 40, the digital promotion 21 is redeemed. The digital promotion 21 is redeemed, for example, by applying the redemption value to the given product or guest check of the given user. The matching operations may occur at the POS terminal 50, for example, or at the digital promotion server 40. Confirmation of redemption may be communicated from the POS terminal 50 to the digital promotion server 40. The operations end at Block 80.

Figure 5:
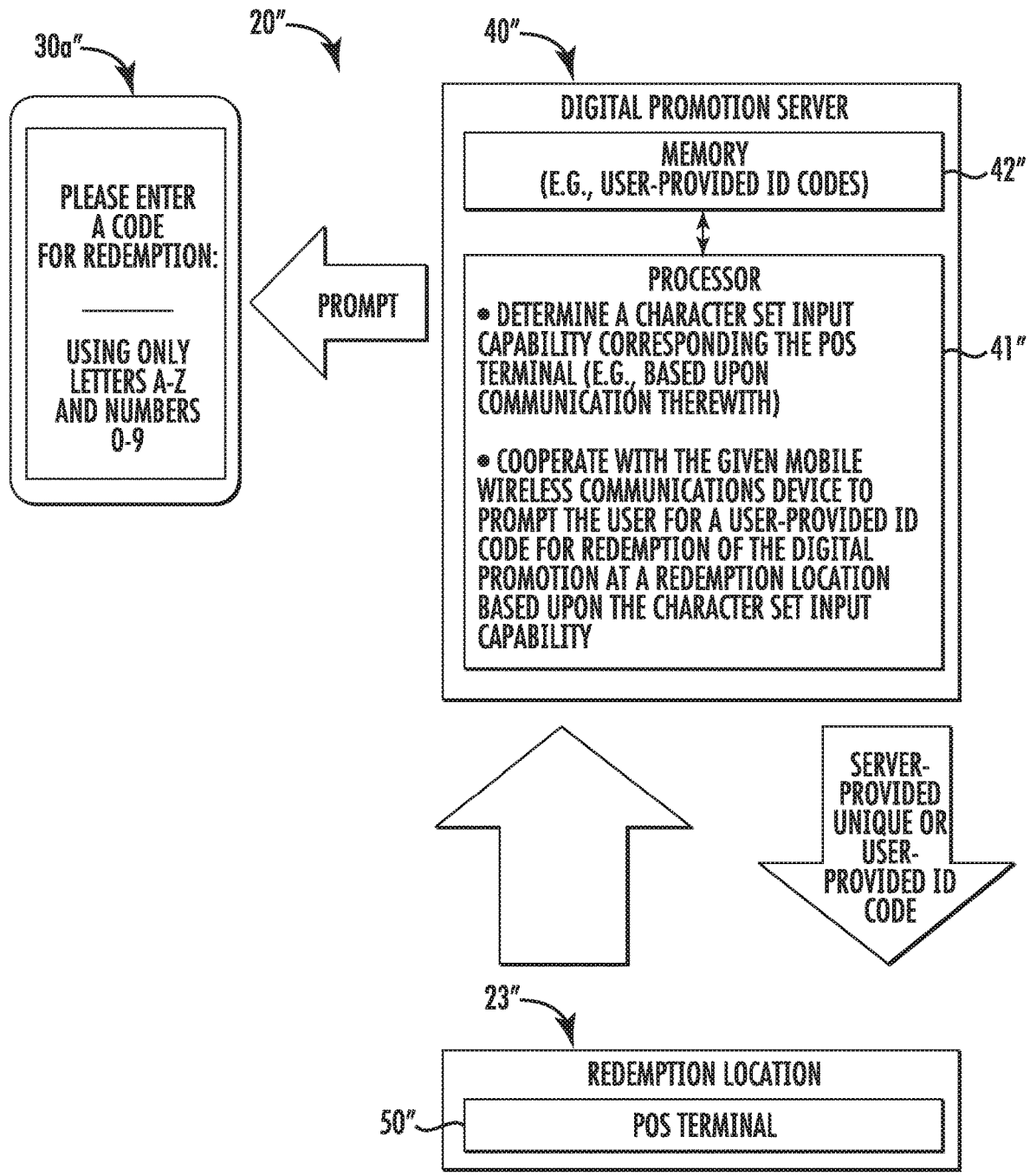
FIG. 5 is a schematic diagram of a system for processing a digital promotion in accordance with another embodiment.

Referring now to FIG. 5, in another embodiment, the digital promotion server 40″ may determine a character set input capability corresponding to the POS terminal 50″ at the redemption location 23″ and prompt the user for the user-provided identification code based upon the character set input capability. This may be particularly advantageous when, for example, the characters available to the given user at the given mobile wireless communications device 30*a*″ are larger than is capable of being entered at the POS terminal 50″ (e.g., emojis can be typed as input on the given mobile wireless communications device and thus may be included in the user-provided identification code, while the POS terminal cannot accept emojis as input). By prompting the user to enter only characters that are recognizable and capable of being provided as input to the POS terminal 50″, potential redemption issues may be reduced. Moreover, when there are multiple redemption locations 23″, the digital promotion server 40″ determines, based upon respective communication therewith, respective character set input capabilities. The digital promotion server 40″ prompts the user for the user-provided ID code based upon the least capable character set input capability that represents the least common set. In some embodiments, a geographic location of the user based upon the respective mobile wireless communications device 30*a*″ may be used as a basis for determining the character set input capabilities.

As will be appreciated by those skilled in the art, the system 20 described herein may provide increased processing time with respect to prior approaches. For example, the system 20, by permitting the user to provide a user-provided ID code for redemption may process a redemption that may be unique, bypasses the digital promotion server 40 from having to generate a random unique ID code and communicate that random unique ID code to the given user at the given mobile wireless communications device 30*a*, which increases processing time. Thus, the system 20 is an improvement in technology and, more particularly, an improvement to digital promotion processing.

A method aspect is directed to a method of processing a digital promotion 21. The method includes using a digital promotion server 40 to generate a digital promotion 21 for a given product based upon a promotion request, and communicate the digital promotion to a given mobile wireless communications device 30*a*-30*n* from among a plurality thereof based upon the promotion request. The method also includes using the digital promotion server 40 to cooperate with the given mobile wireless communications device 30*a* to prompt a respective user for a user-provided identification code for redemption of the digital promotion at a redemption location. The method further includes using the digital promotion server 40 to determine whether the user-provided identification code is unique relative to other user-provided identification codes provided by other mobile wireless communications devices 30*b*-30*n* from among the plurality thereof, and when so, store the user-provided identification code for redemption of the digital promotion 21, otherwise generate a server-provided unique identification code and communicate the server-provided unique identification code to the given mobile wireless communications device 30*a*. The method also includes using the digital promotion server 40 to cooperate with the redemption location 23 to redeem the digital promotion 21 for the given product based upon one of the user-provided identification code and the server-provided unique identification code.

A computer readable medium is directed to non-transitory computer readable medium for processing a digital promotion 21. The non-transitory computer readable medium includes computer executable instructions that when executed by a processor 41 cause the processor to perform operations. The operations include generating a digital promotion 21 for a given product based upon a promotion request, and communicating the digital promotion to a given mobile wireless communications device 30a-30n from among a plurality thereof based upon the promotion request. The operations include cooperating with the given mobile wireless communications device 30a to prompt a respective user for a user-provided identification code for redemption of the digital promotion 21 at a redemption location. The operations also include determining whether the user-provided identification code is unique relative to other user-provided identification codes provided by other mobile wireless communications devices 30b-30n from among the plurality thereof, and when so, storing the user-provided identification code for redemption of the digital promotion 21, otherwise generating a server-provided unique identification code and communicating the server-provided unique identification code to the given mobile wireless communications device 30a. The operations may further include cooperating with the redemption location 23 to redeem the digital promotion 21 for the given product based upon one of the user-provided identification code and the server-provided unique identification code.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A system for processing a digital promotion comprising:
    a plurality of mobile wireless communications devices, each associated with a respective user; and
    a digital promotion server configured to
        generate a digital promotion for a given product based upon a promotion request, and communicate the digital promotion to a given mobile wireless communications device based upon the promotion request,
        cooperate with the given mobile wireless communications device to prompt the user for a user-provided identification code for redemption of the digital promotion at a redemption location,
        determine whether the user-provided identification code is unique relative to other user-provided identification codes provided by other mobile wireless communications devices from among the plurality thereof, and when so, store the user-provided identification code for redemption of the digital promotion, otherwise generate a server-provided unique identification code and communicate the server-provided unique identification code to the given mobile wireless communications device, and
        cooperate with the redemption location to redeem the digital promotion for the given product based upon one of the user-provided identification code and the server-provided unique identification code.

2. The system of claim 1 further comprising a point-of-sale (POS) terminal at the redemption location; and wherein the digital promotion server is configured to cooperate with the POS terminal to redeem the digital promotion.

3. The system of claim 2 wherein the digital promotion server is configured to cooperate with the POS terminal to redeem the digital promotion based upon input of one of the user-provided identification code and the server-provided unique identification code.

4. The system of claim 2 wherein the digital promotion server is configured to determine a character set input capability corresponding to the POS terminal and prompt the user for the user-provided identification code based upon the character set input capability.

5. The system of claim 1 further comprising a promotion provider mobile wireless communications device configured to communicate the promotion request to the digital promotion server.

6. The system of claim 1 wherein the digital promotion server is configured to operate a messenger bot; and wherein the promotion request is made via the messenger bot.

7. The system of claim 1 wherein the digital promotion server is configured to determine whether the user-provided identification code is unique based upon a Bloom filter.

8. The system of claim 1 wherein the digital promotion has a redemption value associated therewith; and wherein the digital promotion server is configured to cooperate with the redemption location to apply a credit to a guest check associated with the user in an amount equal to the redemption value.

9. The system of claim 1 wherein the redemption value corresponds to an entire purchase price of the given product.

10. A digital promotion server for processing a digital promotion comprising:
    a processor and an associated memory configured to
        generate a digital promotion for a given product based upon a promotion request, and communicate the digital promotion to a given mobile wireless communications device from among a plurality thereof based upon the promotion request,
        cooperate with the given mobile wireless communications device to prompt a respective user for a user-provided identification code for redemption of the digital promotion at a redemption location,
        determine whether the user-provided identification code is unique relative to other user-provided identification codes provided by other mobile wireless communications devices from among the plurality thereof, and when so, store the user-provided identification code for redemption of the digital promotion, otherwise generate a server-provided unique identification code and communicate the server-provided unique identification code to the given mobile wireless communications device, and
        cooperate with the redemption location to redeem the digital promotion for the given product based upon one of the user-provided identification code and the server-provided unique identification code.

11. The digital promotion server of claim 10 wherein the processor and the associated memory are configured to cooperate with a point-of-sale (POS) terminal at the redemption location to redeem the digital promotion.

12. The digital promotion server of claim 11 wherein the processor and the associated memory are configured to cooperate with the POS terminal to redeem the digital promotion based upon input of one of the user-provided identification code and the server-provided unique identification code.

13. The digital promotion server of claim 11 wherein the processor and the associated memory are configured to determine a character set input capability corresponding to the POS terminal and prompt the user for the user-provided identification code based upon the character set input capability.

14. The digital promotion server of claim 10 wherein the digital promotion server is configured to determine whether the user-provided identification code is unique based upon a Bloom filter.

15. A method of processing a digital promotion comprising:

using a digital promotion server to
generate a digital promotion for a given product based upon a promotion request, and communicate the digital promotion to a given mobile wireless communications device from among a plurality thereof based upon the promotion request,
cooperate with the given mobile wireless communications device to prompt a respective user for a user-provided identification code for redemption of the digital promotion at a redemption location,
determine whether the user-provided identification code is unique relative to other user-provided identification codes provided by other mobile wireless communications devices from among the plurality thereof, and when so, store the user-provided identification code for redemption of the digital promotion, otherwise generate a server-provided unique identification code and communicate the server-provided unique identification code to the given mobile wireless communications device, and
cooperate with the redemption location to redeem the digital promotion for the given product based upon one of the user-provided identification code and the server-provided unique identification code.

16. The method of claim 15 wherein using the digital promotion server comprises using the digital promotion server to cooperate with a point-of-sale (POS) terminal at the redemption location to redeem the digital promotion.

17. The method of claim 16 wherein using the digital promotion server comprises using the digital promotion server to cooperate with the POS terminal to redeem the digital promotion based upon input of one of the user-provided identification code and the server-provided unique identification code.

18. The method of claim 16 wherein using the digital promotion server comprises using the digital promotion server to determine a character set input capability corresponding to the POS terminal and prompt the user for the user-provided identification code based upon the character set input capability.

19. The method of claim 15 wherein using the digital promotion server comprises using the digital promotion server to determine whether the user-provided identification code is unique based upon a Bloom filter.

20. A non-transitory computer readable medium for processing a digital promotion, the non-transitory computer readable medium comprising computer executable instructions that when executed by a processor cause the processor to perform operations comprising:

generating a digital promotion for a given product based upon a promotion request, and communicating the digital promotion to a given mobile wireless communications device from among a plurality thereof based upon the promotion request;
cooperating with the given mobile wireless communications device to prompt a respective user for a user-provided identification code for redemption of the digital promotion at a redemption location;
determining whether the user-provided identification code is unique relative to other user-provided identification codes provided by other mobile wireless communications devices from among the plurality thereof, and when so, storing the user-provided identification code for redemption of the digital promotion, otherwise generating a server-provided unique identification code and communicating the server-provided unique identification code to the given mobile wireless communications device; and
cooperating with the redemption location to redeem the digital promotion for the given product based upon one of the user-provided identification code and the server-provided unique identification code.

21. The non-transitory computer readable medium of claim 20 wherein the operations comprise cooperating with a point-of-sale (POS) terminal at the redemption location to redeem the digital promotion.

22. The non-transitory computer readable medium of claim 21 wherein the operations comprise cooperating with the POS terminal to redeem the digital promotion based upon input of one of the user-provided identification code and the server-provided unique identification code.

23. The non-transitory computer readable medium of claim 21 wherein the operations comprise determining a character set input capability corresponding to the POS terminal and prompt the user for the user-provided identification code based upon the character set input capability.

24. The non-transitory computer readable medium of claim 20 wherein the operations comprise determining whether the user-provided identification code is unique based upon a Bloom filter.

* * * * *